United States Patent [19]
Lanz

[11] 4,368,904
[45] Jan. 18, 1983

[54] CONNECTION FITTING

[75] Inventor: Werner Lanz, Wetzikon, Switzerland

[73] Assignee: PMA, Elektro AG, Wetzikon, Switzerland

[21] Appl. No.: 125,628

[22] Filed: Feb. 28, 1980

[30] Foreign Application Priority Data

Mar. 3, 1979 [DE] Fed. Rep. of Germany ....... 2908337

[51] Int. Cl.³ ............................................ F16L 55/00
[52] U.S. Cl. .................................... 285/175; 285/305; 285/423; 285/DIG. 4
[58] Field of Search ............... 285/369, 423, 175, 305, 285/DIG. 4, 403, 419, 374, 325; 403/379, 378, 324; 411/517, 518, 353

[56] References Cited

U.S. PATENT DOCUMENTS

| | | | |
|---|---|---|---|
| 1,881,980 | 10/1932 | Thomas | 285/305 |
| 2,127,284 | 8/1938 | Board | 285/305 X |
| 2,615,740 | 10/1952 | Nathan | 285/374 X |
| 3,239,254 | 3/1966 | Campbell | 285/DIG. 4 |
| 3,560,027 | 2/1971 | Graham | 285/305 X |
| 3,711,633 | 1/1973 | Ghirardi | 285/DIG. 4 |
| 3,934,902 | 1/1976 | McNamee | 285/419 |
| 4,059,295 | 11/1977 | Helm | 285/305 |
| 4,248,459 | 2/1981 | Pate | 285/DIG. 4 |

FOREIGN PATENT DOCUMENTS

| | | | |
|---|---|---|---|
| 1993072 | 9/1958 | Fed. Rep. of Germany | |
| 1094387 | 12/1954 | France | |
| 569915 | 11/1975 | Switzerland | 285/305 |
| 1253901 | 11/1971 | United Kingdom | 285/305 |
| 555254 | 6/1977 | U.S.S.R. | 285/DIG. 4 |

Primary Examiner—Dave W. Arola
Attorney, Agent, or Firm—Schwartz, Jeffery, Schwaab, Mack, Blumenthal & Koch

[57] ABSTRACT

The specification describes a connector fitting for flexible corrugated tubing having parallel, coaxial corrugations; the connector comprising a bushing with a housing for accommodating in use the end of a length of corrugated tubing which housing is provided with at least one opening for receiving a locking element which is generally C-shaped in form and has resilient legs, the inner surface of the locking element is provided with a plurality of ribs the thickness of which corresponds approximately to the spacing of adjacent corrugations of the tubing and the opening in the housing is bounded by a pair of bridge pieces separation of which is substantially the same as the distance between the outermost surfaces of the legs of the locking element. A seal may be provided which in use lies between the outer surface of the corrugated tubing and the inner surface of the housing, the seal having a toroidal end part lying between the end of the corrugated tubing and a stop formed in the housing.

7 Claims, 4 Drawing Figures

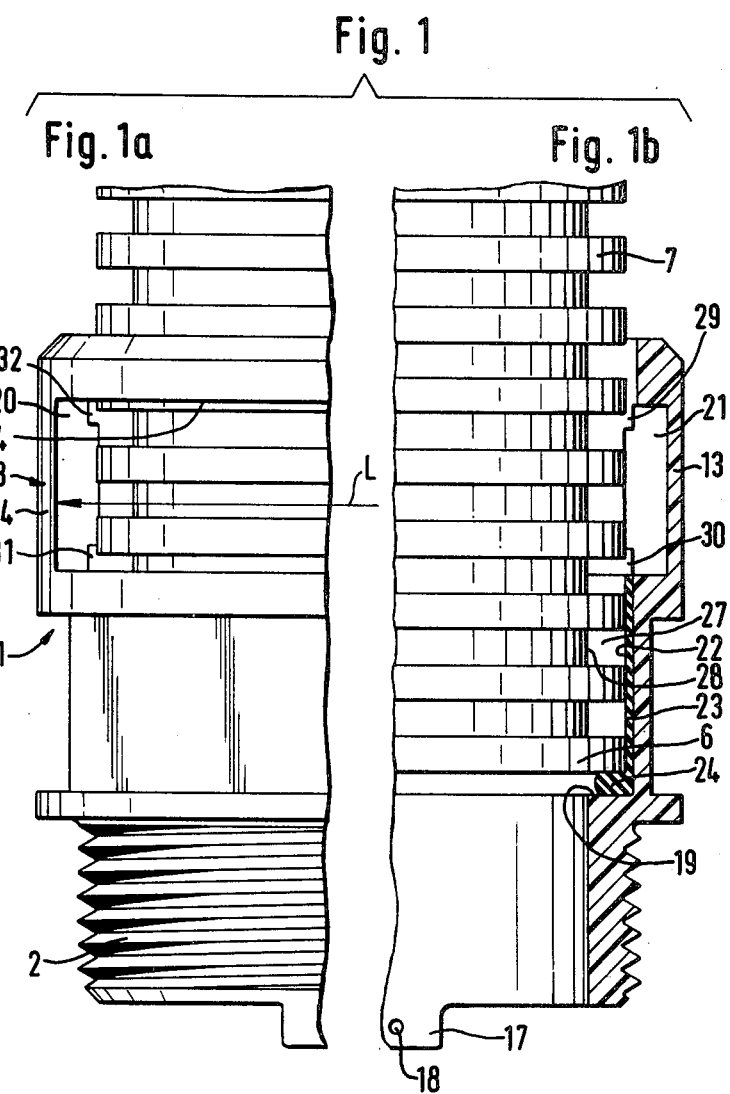

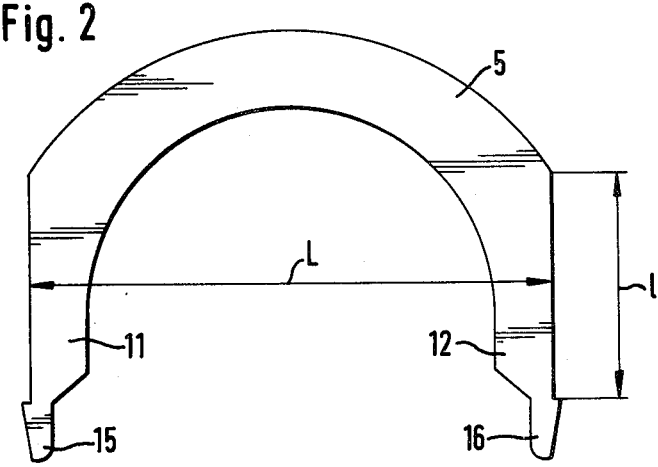
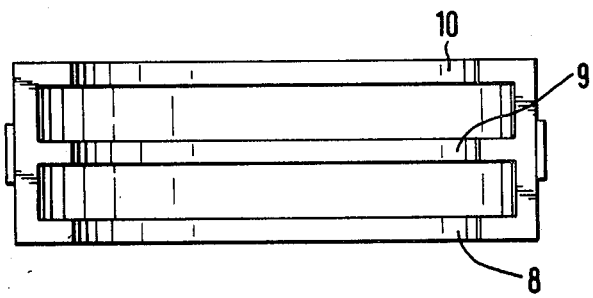
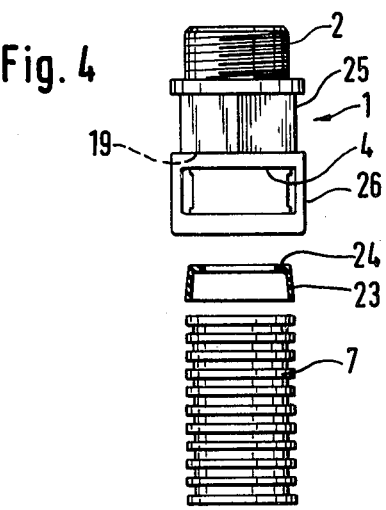

CONNECTION FITTING

DESCRIPTION

The invention concerns a connecting fitting for flexible corrugated tube with corrugations running parallel with one another and disposed concentrically around the axis of the tube and a screw-in bushing with a threaded part exhibiting a housing which accommodates the end of the corrugated tube and is provided with at least one opening in part of its circumference to receive a locking element.

Flexible corrugated tubes of the kind described are used as flexible ducting for example when laying electricity cables, aerial cables or the like in new buildings or when connecting up industrial machines. The areas of application range from vehicle manufacturing to shipbuilding and aircraft production in both the civil and the military sectors. Another area of application is fibre optics. The corrugated tubes are preferably made of plastic but they can also be produced in metal.

To join such corrugated tubes together or to provide water- and dustproof connections at their ends, connecting fittings are needed which take the form of screw-in bushings.

Screw-in bushings exhibiting two threaded parts are already known. Such a threaded part is fixed to the end of a corrugated tube by passing a snap ring or fitting piece over the end of the corrugated tube and tightening the union nut. This method of fixing the tube is time-consuming, complicated and takes up space. As three fixing elements are required, it often happens that during assembly the union nut is not screwed up sufficiently and the corrugated tube is thus inadequately secured with the result that the tube and the screw-in bushing are not held together firmly enough. There is also the great danger that a screw-in bushing fitted with the aid of a nut can easily come loose when subjected to any vibration, for example when used in vehicles or machines.

Consequently the underlying objective of the invention is to provide a remedy here and propose a connecting fitting for flexible corrugated tubing exhibiting parallel corrugations which can be fitted more easily, more rapidly and more reliably, which consists of the smallest possible number of parts, which can be used in the most confined spaces, which does not come loose on its own when subjected to vibration and with the aid of which a sealed connection is obtained.

This objective is achieved in that in the connecting fitting described at the start the locking element is C-shaped and designed with springy legs on the inside of which run a plurality of ribs which are each of a thickness roughly corresponding to the distance between two corrugations of the tube, and the opening extending over part of the periphery of the housing is divided by two bridge-pieces whose separation L on the secant of the housing is the same as the external distance L between the legs of the locking element.

Preferably, the screw-in bushing exhibits a threaded part and a housing which accommodates the end of the corrugated tube and consists of a part receiving the locking element and an end-piece for the corrugated tube, the end-piece for the corrugated tube having an axial length which covers a plurality of corrugations of the corrugated tube.

Thus the connecting fitting is made of just two separate parts, namely a screw-in bushing and a locking element. The locking element is only inserted in the opening in the screw-in bushing when the end of the flexible corrugated tube abuts against a stop inside the screw-in bushing.

With the named features of the invention the locking device is not held using just one channel between two corrugations, instead a plurality of parallel channels are utilised to secure the locking device with the result that a firm and reliable grip is ensured. Through the design of the locking element in accordance with the invention, the bridge-pieces on the housing of the screw-in bushing exert a clamping action on the springy legs of the locking element so that the ribs disposed inside the locking element penetrate to a corresponding depth into the channels between the corrugations of the corrugated tube.

In order to prevent unintentional detachment of the locking element, the ends of the legs of the locking element exhibit hooks which each engage behind the edge of a bridge-piece when the locking element is pressed home in the opening in the part receiving the locking element.

In an extension of the invention, a sealing element is disposed between the end of the corrugated tube and the inner wall of the end-piece for the corrugated tube when the fitting is fitted.

Advantageously, the sealing element takes the form of a sleeve seal with an inner torus at one end.

The inner wall of the sleeve seal, whose outer wall lies flat against the inner wall of the screw-in bushing, combines with the corrugated tube to form a labyrinth seal with a plurality of chambers so the overall result of this is to give a particularly good sealing effect.

To facilitate fitting, the external shell of the screw-in bushing is hexagonal in the area of the end-piece for the corrugated tube.

The invention is explained in greater detail with reference to the drawing in which:

FIG. 1 shows a plan view of the connecting fitting with the corrugated tube, partly in section;

FIG. 2 shows a side view of the locking element;

FIG. 3 shows the locking element in FIG. 2, but swung through 90°, and

FIG. 4 shows an exploded view of a connecting fitting with O-ring, sealing sleeve and corrugated tube.

FIG. 1 shows the connecting fitting 1 with its threaded part 2 and the housing 3. Here the end 6 of the corrugated tube 7 is run as far as the stop 19 inside the housing 3. The housing 3 is provided with an opening 4 which is divided by the bridge-pieces 13 and 13 so that two slot-like apertures 20 and 21 are formed in addition to the opening 4 and into which the legs 11 and 12 of locking element 5 shown in FIG. 2 penetrate when it is fitted.

The connecting fitting 1 is so constructed as to exhibit a threaded part 2 and a housing 3 which accommodates the end 6 of the corrugated tube 7 and consists of a part 26 receiving the locking element and an end-piece 25 for the corrugated tube. The end-piece 25 for the corrugated tube has an axial length that covers a plurality of corrugations of the corrugated tube 7.

Between the corrugated tube and the housing wall the end-piece 25 for the corrugated tube accommodates the sleeve seal 23 with its torus 24 which bears against the stop 19 in the end-piece 25 for the corrugated tube. Co-operating with the corrugated tube, this produces an excellent labyrinth seal with closed chambers 27.

The chambers are formed by the shell 28 of the corrugated tube, the facing corrugations and the sleeve seal 23.

The locking element 5 shown in FIGS. 2 and 3 is C-shaped so that springy legs 11 and 12 are formed bearing hook-like elements 15 and 16 at their respective ends. The external distance L separating the two legs 11 and 12 is the same as the distance L on the secant between the two bridge-pieces 13 and 14 so that the locking element 5 can be introduced into the opening 4 in the connecting fitting 1 and the outer faces of the springy tongues 11 and 12 press against the inner faces of the bridge-pieces 13 and 14.

The inside of the locking element 5 exhibits ribs 8, 9, 10 which can be seen in FIG. 3 and are of a size and interspaced such that in each case a corrugation of the tube 7 can penetrate into the channel formed by the gap between two ribs 8 and 8, 9 and 10.

The hook-like elements 15 and 16 on the legs 11 and 12 of the locking element extend slightly beyond the external span L of the legs. Since the legs are springy, this does not present any problem when inserting the locking element in the opening 4 in the connecting fitting 1. As the width of the bridge-pieces 13 and 14 in the circumferential direction of the housing 3 is the same as the length 1 of the legs 11 and 12 of the locking element 5, the hook-like elements 15 and 16 each engage behind the corresponding edge of the bridge-elements 13 and 14 respectively when the locking element 5 is pressed home. This prevents any unintentional detachment of the locking element 4 whereas on the other hand the locking element can be pushed out of the opening 4 by exerting simultaneous pressure on the hook-like elements 15 and 16 in a radial direction.

The connecting fitting and its locking element are preferably made of plastic, but they can also be produced in metal.

The outer end of the threaded part 2 exhibits a lug 17 with a hole 18 so that a guiding or strain-relief line can be attached to it.

FIG. 4 shows an exploded view of the individual components.

The corrugated tube 7 is run into the sleeve seal 23 as far as its torus 24. Here the connecting fitting 1 consists of three parts, namely the threaded part 2, the connecting part 25 for the corrugated tube and the part 26 receiving the locking element. The part 26 receiving the locking element has an opening 4 into which the C-shaped locking element 5 is inserted after the tube 7 and the sleeve seal 23 have been introduced. To facilitate assembly and make handling better, the connecting fitting or screw-in bushing 1 is given a hexagonal shell in the area of the end-piece 25 for the corrugated tube.

To allow easy disconnection of the locking element 5 as well, the inner edges of the apertures 21 in the locking part 26 receiving the legs 11, 12 of the locking element 5 exhibit protrusions 29, 30, 31, 32 at their lateral extremities. As a result, the inside faces of the legs of the locking element form a relatively small slot with the edges of the apertures in the locking part 26 so that the legs can be bent slightly to release the lock provided by the hook-like elements 15, 16. In this way the locking element 5 can easily be released from its engagement with the bridge-pieces 13 and 14.

The connecting fitting in accordance with the invention ensures constant-strength connections regardless of the force applied by a fitter since the connecting fitting is securely attached to the corrugated tube when the locking element engages snugly and audibly. Moreover, the connecting fitting cannot be detached unintentionally by vibration.

I claim:

1. A connector fitting for flexible corrugated tubing having parallel, spaced, coaxial corrugations defining parallel spaced grooves, said connector fitting comprising a bushing having a housing, a threaded part and an end piece, said end piece being intermediate said housing and threaded part, said housing accommodating the end of a length of corrugated tubing having at least one opening and two apertures opposite said opening receiving a locking element, said end piece having the length of several corrugations, wherein the locking element is generally C-shaped and has resilient legs, means to retain said locking element in said housing and a plurality of ribs formed on the inside of said legs which ribs are each of a thickness approximately corresponding to the grooves between adjacent corrugations of the tubing wherein said locking element surrounds said tubing, said ribs engage said grooves and wherein said opening is at least as wide as the distance between the outermost surfaces of the legs of the locking element.

2. A connector fitting according to claim 1 wherein the areas of said housing between said opening and apertures define bridge pieces which have a width in the circumferential direction of the housing corresponds to the length of the legs of the locking element.

3. A connector fitting according to claim 1 wherein said retaining means are located at the ends of the legs of the locking element and comprise hook portions which grip against the ends of the opening when the locking element is in its operative position.

4. A connector fitting according to claim 1 wherein the outer wall of the bushing is hexagonal in the area of the end-piece for the corrugated tubing.

5. A connector fitting according to claim 1 wherein the lateral extremities of the openings receiving the legs of locking element have protrusions.

6. A connector fitting according to claim 1 wherein a sealing element is provided between the end of the tubing and the inner wall of the end-piece for the corrugated tubing.

7. A connector fitting according to claim 6 wherein the sealing element is in the form of a sleeve having abutment means thereon.

* * * * *